(12) United States Patent
Hiragi et al.

(10) Patent No.: US 11,722,885 B2
(45) Date of Patent: Aug. 8, 2023

(54) NETWORK ADDRESSING METHOD, CONTROL STATION, AND EARTH STATION

(71) Applicant: Mitsubishi Electric Corporation, Chiyoda-ku (JP)

(72) Inventors: Makiko Hiragi, Chiyoda-ku (JP); Kazunobu Fukuda, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 9 days.

(21) Appl. No.: 16/969,718

(22) PCT Filed: Jan. 28, 2019

(86) PCT No.: PCT/JP2019/002792
§ 371 (c)(1),
(2) Date: Aug. 13, 2020

(87) PCT Pub. No.: WO2019/171825
PCT Pub. Date: Sep. 12, 2019

(65) Prior Publication Data
US 2021/0006970 A1      Jan. 7, 2021

(30) Foreign Application Priority Data
Mar. 6, 2018   (JP) .................................. 2018-039575

(51) Int. Cl.
*H04B 7/185*  (2006.01)
*H04B 7/204*  (2006.01)
(Continued)

(52) U.S. Cl.
CPC .......... *H04W 8/26* (2013.01); *H04B 7/18517* (2013.01); *H04B 7/204* (2013.01); *H04L 61/5007* (2022.05); *H04W 84/06* (2013.01)

(58) Field of Classification Search
None
See application file for complete search history.

(56) References Cited

U.S. PATENT DOCUMENTS 6,449,267 B1 * 9/2002 Connors ................. H04L 47/28
                                                                370/347
6,968,394 B1 * 11/2005 El-Rafie .................. H04L 69/16
                                                                455/3.01
(Continued)

FOREIGN PATENT DOCUMENTS

CN         1582542 A    2/2005
CN       105993135 A   10/2016
(Continued)

OTHER PUBLICATIONS

International Search Report dated Mar. 19, 2019 in PCT/JP2019/002792 filed Jan. 28, 2019, 2 pages.
(Continued)

*Primary Examiner* — Alpus Hsu
(74) *Attorney, Agent, or Firm* — Oblon, McClelland, Maier & Neustadt, L.L.P.

(57) ABSTRACT

In a satellite communication system to perform routing with a communication channel via a satellite, when an earth station is to enter the satellite communication system, a control station notifies the earth station, using a control channel via the satellite, of the network address of the earth station managed by the control station. After that, the earth station can establish the communication channel via the satellite.

20 Claims, 8 Drawing Sheets

(51) Int. Cl.
*H04L 29/12* (2006.01)
*H04W 8/26* (2009.01)
*H04L 61/5007* (2022.01)
*H04W 84/06* (2009.01)

(56) References Cited

U.S. PATENT DOCUMENTS

| | | | | |
|---|---|---|---|---|
| 7,079,505 B2* | 7/2006 | Okunishi | ........... | H04B 7/18582 370/321 |
| 7,099,347 B2* | 8/2006 | Kita | ................... | H04B 7/18513 370/436 |
| 8,966,011 B2* | 2/2015 | Friedrich | .......... | H04L 29/12066 709/219 |
| 9,735,859 B1* | 8/2017 | Snyder | ............... | H04B 7/18517 |
| 2002/0167918 A1* | 11/2002 | Brewer | ................ | H04B 7/1858 370/324 |
| 2003/0045232 A1 | 3/2003 | Parkman | | |
| 2013/0109299 A1 | 5/2013 | Roos et al. | | |
| 2016/0365918 A1* | 12/2016 | Hosotani | ........... | H04W 72/0406 |
| 2018/0167136 A1* | 6/2018 | Eickhoff | ............ | H04B 7/18586 |

FOREIGN PATENT DOCUMENTS

| | | |
|---|---|---|
| JP | 9-186640 A | 7/1997 |
| JP | 2005-502270 A | 1/2005 |
| JP | 2007-208630 A | 8/2007 |
| JP | 2013-5221 A | 1/2013 |
| JP | 2014-175935 A | 9/2014 |
| JP | 2014-175936 A | 9/2014 |
| JP | 2017-11578 A | 1/2017 |

OTHER PUBLICATIONS

Japanese Notification of Reasons for Refusal dated May 19, 2020 in Japanese Application No. 2020-504849, 7 pages (with English Translation).

Takamatsu, "Fundamentals of Satellite Systems, History of Communications Satellites, Transmission Systems, Line Design, etc.: Satellites and Wireless Communication Systems. RF-World: Radio Frequency", No. 15, pp. 72-80, with English Translation (13 total pages).

Combined Chinese Office Action and Search Report dated Dec. 13, 2022 in Chinese Patent Application No. 201980016612.0, (with unedited computer generated English translation of Office Action only), 25 pages.

* cited by examiner

NETWORK ADDRESSING METHOD, CONTROL STATION, AND EARTH STATION

TECHNICAL FIELD

The present disclosure relates to a network addressing method, a control station, and an earth station in a satellite communication system to perform routing with a communication channel via satellite.

BACKGROUND ART

Demand assignment multiple access (DAMA) systems have been heretofore used as satellite communication systems where a plurality of earth stations perform data communication (IP communication) via satellite (see, for example, PTLs 1 and 2). In some cases, a DAMA system needs to specify or change a network address in an earth station (slave station). Such a need arises for setting up a terminal in an earth station (slave station) and routing the terminal, where the terminal has a non-changeable network (e.g., a non-changeable IP address) due to the network security policy of the satellite communication system.

PTL 2 discloses an IP protocol based DAMA system that includes a control station and a plurality of earth stations (slave stations). In this system, the IP addresses of the terminals placed in the earth stations (slave stations) are managed at the control station and also at the earth stations (slave stations), and the IP addresses are assigned to the terminals. In many networks, as disclosed in PTL 1, the terminals in earth stations (slave stations) obtain IP addresses in accordance with the networks by means of, for example, a dynamic host configuration protocol (DHCP) to perform IP communication. In some systems, however, the IP addresses of terminals need to be fixed, with networks being changeable. In such systems, the means for managing networks may be complicated.

In conventional DAMA systems to perform IP routing, the network addresses (subnetwork configurations) in earth stations (slave stations) are statically preset. The user then changes the settings (e.g., the IP addresses or default gateway addresses) for the communication terminals to be connected in earth stations (slave stations) in accordance with the network addresses in the slave stations, thereby allowing connection and communication with the changed settings. Some satellite communication systems may use a star communication (star network configuration) or a meshed communication (meshed network configuration) (see, for example, PTL 3).

CITATION LIST

Patent Literature

PTL 1: Japanese Patent Laying-Open No. 2007-208630
PTL 2: Japanese Patent Laying-Open No. 2013-5221
PTL 3: Japanese Patent Laying-Open No. 9-186640

SUMMARY OF INVENTION

Technical Problem

However, some user terminals have non-changeable network settings (e.g., non-changeable IP addresses) due to, for example, the security policy, in which cases conventional DAMA systems to perform IP routing cannot work effectively.

In conventional DAMA systems to perform IP routing, with any change in network setting for a certain slave station, the associated changes are made to the settings for a control station and slave stations. By doing so, the network addresses in the slave stations (i.e., the network configuration of the satellite communication system) can be changed to a certain degree. However, if there are a plurality of changes in network configuration, such changes are difficult to make or take a long time. Changing the network configuration, even if possible, would require all the communicating slave stations to modify their equipment. The change in settings would cause them to stop operation, and also would make the management complicated. Furthermore, in conventional systems, when a communication terminal is moved from a slave station A to a slave station B while its IP address setting is maintained, the change in settings is required not only for slave stations A and B, but also for all the slave stations that need to communicate with slave stations A and B.

The present disclosure, which has been made to solve the above-described problems, relates to a network addressing method, a control station, and an earth station that allow the management of network addresses at the control station.

Solution to Problem

A network addressing method according to the present disclosure is a network addressing method for a satellite communication system to perform routing between earth stations with a communication channel via satellite, the network addressing method using a control station to manage network addresses of the earth stations. The network addressing method includes: a first entry message transmission step of transmitting a first entry message from a first earth station of the earth stations to the control station using a control channel via the satellite, the first entry message being a message for entry to the satellite communication system; a first network address notification step of, in response to receiving the first entry message, notifying, by the control station, a first network address to the first earth station using the control channel, the first network address being the network address of the first earth station managed by the control station; a second entry message transmission step of transmitting a second entry message from a second earth station of the earth stations to the control station using the control channel, the second entry message being a message for entry to the satellite communication system; and a second network address notification step of, in response to receiving the second entry message, notifying, by the control station, a second network address to the second earth station using the control channel, the second network address being the network address of the second earth station managed by the control station.

A control station according to the present disclosure is a control station to manage network addresses of earth stations in a satellite communication system in which routing between the earth stations is performed with a communication channel via satellite after notification of the network addresses. The control station includes: a network address manager to hold the network addresses in association with the respective earth stations; and a control station controller to notify the earth stations, using a control channel via the satellite, of a network address from among the network addresses stored in the network address manager in association with the respective earth stations, in response to receiving an entry message from the earth stations using the control channel, the entry message being a message for entry to the satellite communication system.

An earth station according to the present disclosure is an earth station for use in a satellite communication system to perform routing with a communication channel via satellite. The earth station includes: a network address storage to store a network address notified by a control station; an earth station controller to transmit an entry message to the control station using a control channel via the satellite, the entry message being a message for entry to the satellite communication system; and to be notified, by the control station, of a network address of at least its own station; and an earth station communication interface to establish the communication channel to transmit and receive data, using the network address notified by the control station.

Advantageous Effects of Invention

As described above, the present disclosure can provide a network addressing method, a control station, and an earth station that can change the settings of network addresses, with centralized control by the control station.

DESCRIPTION OF EMBODIMENTS

Embodiment 1

A communication system, a communication method, a network addressing method, a control station, and an earth station in embodiment 1 of the present disclosure will now be described with reference to FIGS. 1 to 4. In the drawings, like reference signs designate like or corresponding parts, and the detailed description of such parts is not repeated. In FIGS. 1 to 4, a control station 1, an earth station 301 (slave station 301), an earth station 302 (slave station 302), a communication terminal 401 (IP terminal 401), and a communication terminal 402 (IP terminal 402) constitute an IP protocol based DAMA satellite communication system via a satellite 2. A network address table 501 and a network address table 502 are the tables of network address for earth station 301 (slave station 301) and earth station 302 (slave station 302), respectively. In the communication system (communication method) in embodiment 1, earth stations 301 and 302 establish a communication channel 22 in response to the instruction from control station 1 by way of a control channel 21, thus achieving bidirectional data communication over communication channel 22.

Figure 1:
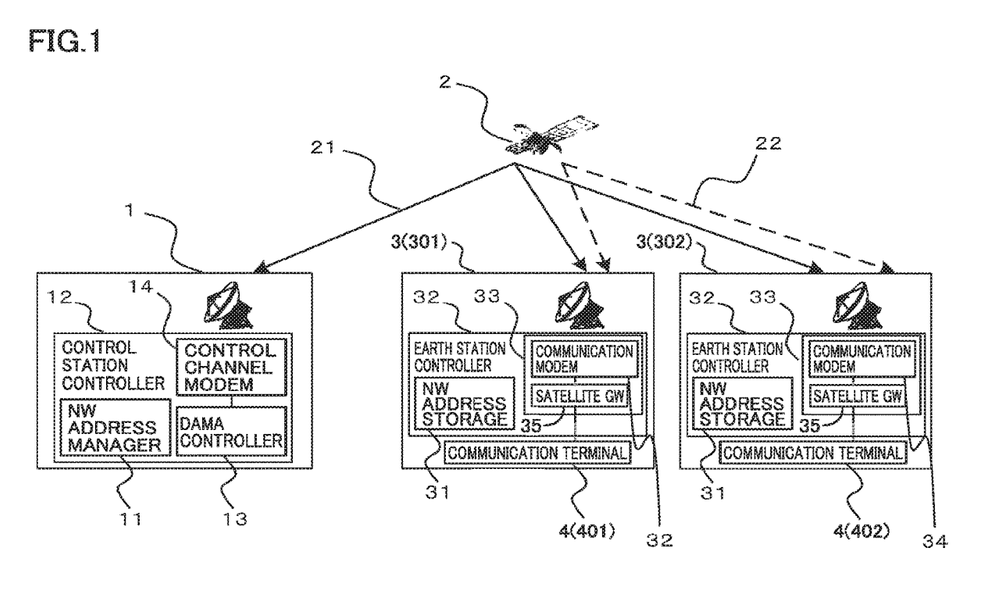
FIG. 1 is a functional block diagram of a communication system in embodiment 1 of the present disclosure.

In FIG. 1, control station 1, which is a master station to control a satellite communication system, is particularly suitable for an IP protocol based DAMA satellite communication system. Specifically, control station 1 controls a DAMA satellite communication system. Satellite 2 is a satellite station for a DAMA satellite communication system. Control station 1 manages the network addresses of earth stations 3 in a satellite communication system in which the routing between earth stations 3 is performed with a communication channel via satellite 2 after notification of the network addresses. Earth stations 3 are slave stations to perform IP protocol based communication via a communication channel using a satellite communication system. Slave stations 3 perform IP data communication using a DAMA satellite communication system. That is, as with control station 1, slave stations 3 are suitable for an IP protocol based DAMA satellite communication system. Earth stations 3 are a plurality of "earth station 301, earth station 302, . . . earth station 30n" in a satellite communication system to perform routing with a communication channel via satellite 2, where n is a positive integer. FIG. 1 illustrates a case with two earth stations 3 (earth stations 301 and 302), by way of example.

A DAMA method allows a plurality of earth stations 3 (slave stations 3) to effectively use a communication channel. In a DAMA method, earth stations use a control channel, different from a communication channel, to request the control station to assign a communication channel, so that the control station can appropriately assign a communication channel for use in communication between earth stations or between earth stations and the control station. The control channel, different from the communication channel, is also called a "CSC" since it is a channel for requesting the assignment of communication channel. CSC represents a common signaling channel. The control station receives a channel assignment request from earth stations and assigns a communication channel, as disclosed in PTL 1. In a DAMA satellite communication system and a DAMA communication method, the functions of the control station include: a function of managing the status of communication of earth stations and the status of use of satellite channel, and assigning appropriate channels in accordance with requests from earth stations; and a function of communication for notifying earth stations of the channel assignment results.

In FIG. 1, control station 1 includes a network address manager 11, a control station controller 12, a DAMA controller 13, and a control channel modem 14. Network address manager 11 (NW address manager 11) stores and manages a network address(es) for each of earth stations 3 (earth station 301, earth station 302, . . . earth station 30n) (see, for example, FIG. 2). Control channel 21 is a CSC for channel control through which control station 1 can monitor, and assign channels for, earth stations 3 (earth station 301, earth station 302, . . . earth station 30n) by way of satellite 2. In FIG. 1, control channel 21 (CSC 21) is shown as imaginary arrowed solid lines.

In FIG. 1, control station controller 12 (master station controller 12, controller 12) receives an entry message from earth station 3 using control channel 21 via satellite 2, the entry message being a message for entry to the satellite communication system. In response to receiving the entry message, control station controller 12 (master station controller 12, controller 12) notifies, using control channel 21, at least earth station 3 that has transmitted the entry message, of a network address from among the network addresses held in network address manager 11 in association with the respective earth stations 3 (earth station 301, earth station 302, . . . earth station 30*n*). Control station controller 12 (master station controller 12, controller 12) can also be called "equipment for transmission and reception to and from satellite 2". The equipment for transmission and reception to and from satellite 2 may include a control station antenna and a control station antenna driver to drive the control station antenna; or the control station antenna and the control station antenna driver may also serve as the equipment for transmission and reception.

In FIG. 1, DAMA controller 13 processes DAMA control data. The DAMA control data is exchanged between control station 1 and earth stations 3 via control channel 21. Control channel modem 14 is connected to the control station antenna to transmit and receive the DAMA control data to and from satellite 2. Communication channel 22 is a satellite channel for communication between earth stations 3 (earth station 301, earth station 302, . . . earth station 30*n*) by way of satellite 2. Communication channel 22 is assigned, via control channel 21, for each of earth stations 3 (earth station 301, earth station 302, . . . earth station 30*n*). In FIG. 1, communication channel 22 (satellite channel 22) is shown as imaginary arrowed broken lines. Communication channel 22 is used for IP data communication between earth stations 3 (earth station 301, earth station 302, . . . earth station 30*n*).

In FIG. 1, each of earth stations 3 (earth station 301, earth station 302, . . . earth station 30*n*) includes a network address storage 31, an earth station controller 32, an earth station communication interface 33 (slave station communication interface 33, communication interface 33), a communication modem 34, a satellite GW 35, and a communication terminal 4. Communication terminal 4 may be provided outside earth station 3. Network address storage 31 (NW address storage 31) stores a network address notified by control station 1. Earth station controller 32 (slave station controller 32, controller 32) transmits an entry message to control station 1 using control channel 21 via satellite 2, the entry message being a message for entry to the satellite communication system. Earth station controller 32 is then notified, by control station 1, of the network address of at least its own station.

In FIG. 1, earth station communication interface 33 (slave station communication interface 33, communication interface 33) establishes a communication channel, using the network address notified by control station 1, thereby allowing the transmission and reception of data (IP data communication). Earth station communication interface 33 (slave station communication interface 33, communication interface 33) can also be called "equipment for transmission and reception to and from satellite 2". The equipment for transmission and reception to and from satellite 2 may include an earth station antenna and an earth station antenna driver to drive the earth station antenna; or the earth station antenna and the earth station antenna driver may also serve as the equipment for transmission and reception. Communication modem 34 (earth station communication modem 34, slave station communication modem 34) is connected to the earth station antenna to transmit and receive data to and from another earth station 3. Satellite GW 35 (earth station satellite GW 35, slave station satellite GW 35) serves as a gateway to communication channel 22 (satellite channel 22).

In FIG. 1, communication terminal 4 is connected to satellite GW 35 for IP communication via communication channel 22. In IP communication via communication channel 22, communication terminal 4 transmits IP data via earth station communication interface 33 (slave station communication interface 33, communication interface 33) to the opposite station (another earth station 3 or control station 1) of satellite communication, with satellite GW 35 serving as a gateway of communication terminal 4. At least one communication terminal 4 (IP terminal 4) is provided for each of a plurality of "earth station 301, earth station 302, . . . earth station 30*n*". In other words, communication terminals 4 are "communication terminal 401, communication terminal 402, . . . communication terminal 40*n*", where n is a positive integer, as with earth stations 3. FIG. 1 illustrates a case with two communication terminals 4 (communication terminals 401 and 402), by way of example.

Figure 2:
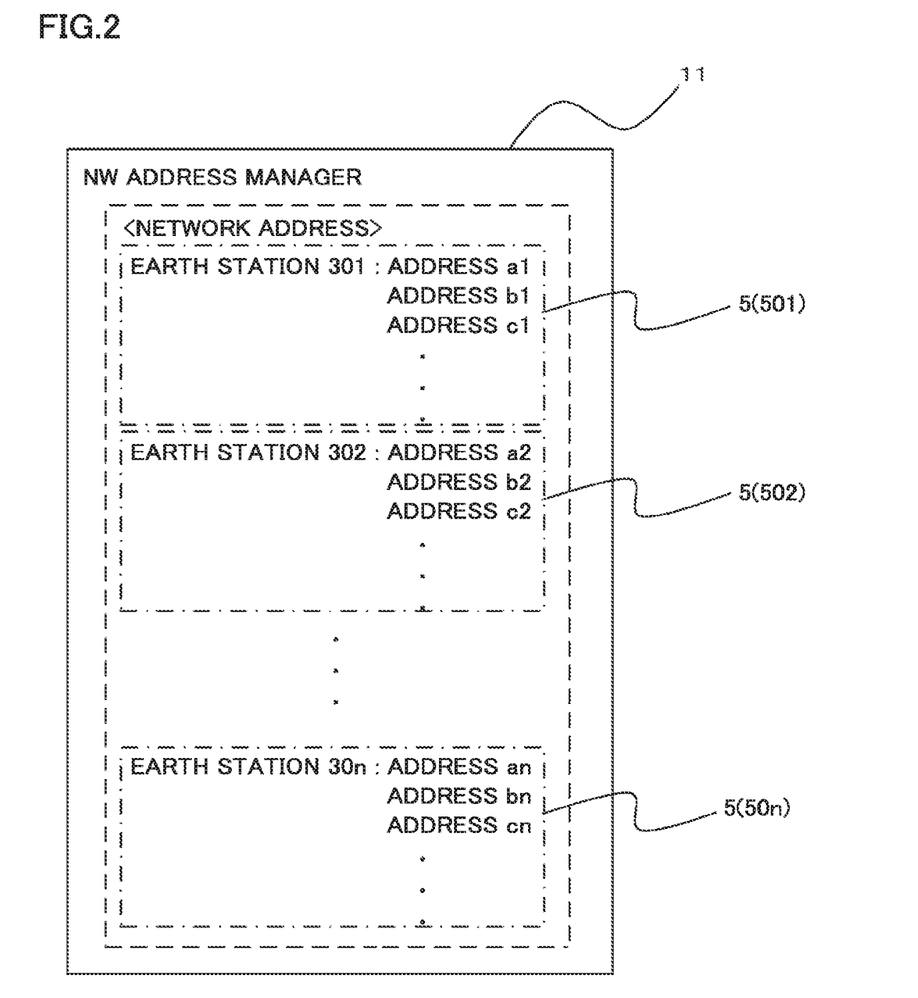
FIG. 2 is an example table of network address for use in the communication system in embodiment 1 of the disclosure.

FIG. 2 is a schematic representation of network address table 5 registered in network address manager 11. Network address table 5 are shown as "network address table 501, network address table 502, . . . network address table 50*n*", where n is a positive integer. Network address table 501, network address table 502, . . . network address table 50*n* are the tables of network address for earth station 301 (slave station 301), earth station 302 (slave station 302), . . . earth station 30*n* (slave station 30*n*), respectively. That is, network address table 5 is a table of network address managed (stored) for each earth station 3. Network address table 5 is composed of at least one network address for each earth station 3. Earth station 3 is notified of the network address table of at least its own station by control station 1 and manages (stores) the network address table, thereby serving as a gateway to communication channel 22.

The operation for network addressing of the satellite communication system in embodiment 1 will now be described. That is, a network addressing method in embodiment 1 will now be described. The method uses control station 1 to manage the network addresses of earth stations 3 in a satellite communication system in which routing is performed between earth stations 3 with communication channel 22 via satellite 2.

The network addressing method in embodiment 1 transmits a first entry message from earth station 301 to control station 1 using control channel 21, the first entry message being a message for entry to the satellite communication system (first entry message transmission step). Specifically, earth station controller 32 of earth station 301 transmits an entry message to control station 1 using control channel 21, the entry message being a message for entry to the satellite communication system. In response to receiving the first entry message, control station 1 notifies a first network address to earth station 301 using control channel 21, the first network address being the network address of earth station 301 managed by control station 1 (first network address notification step). The notification of the first network address includes transmission of "the network address of earth station 3" from control station 1 to earth station 301, as a first response-to-entry message. Specifically, control station controller 12 receives an entry message from earth station 301 using control channel 21, the entry message being a message for entry to the satellite communication system. Control station controller 12 then notifies earth station 301, using control channel 21, of a network address from among the network addresses held in network address manager 11 in association with the respective earth stations 3. Earth station controller 32 of earth station 301 is notified, by control station 1, of the network address of at least its own station.

The network addressing method in embodiment 1 transmits a second entry message from earth station 302 to control station 1 using control channel 21, the second entry message being a message for entry to the satellite communication system (second entry message transmission step). Specifically, earth station controller 32 of earth station 302 transmits an entry message to control station 1 using control channel 21, the entry message being a message for entry to the satellite communication system. In response to receiving the second entry message, control station 1 notifies a second network address to earth station 302 using control channel 21, the second network address being the network address of earth station 302 managed by control station 1 (second network address notification step). The notification of the second network address includes transmission of "the network address of earth station 3" from control station 1 to earth station 302, as a second response-to-entry message. Specifically, control station controller 12 receives an entry message from earth station 302 using control channel 21, the entry message being a message for entry to the satellite communication system. Control station controller 12 then notifies earth station 302, using control channel 21, of a network address from among the network addresses held in network address manager 11 in association with the respective earth stations 3. Earth station controller 32 of earth station 302 is notified, by control station 1, of the network address of at least its own station.

The network addressing method in embodiment 1 may include a step of establishing communication channel 22 by earth stations 3 (communication channel establishment step), after at least one of the first network address notification step and the second network address notification step. Specifically, earth stations 301 and 302 store the network addresses, notified by control station 1, in their network address storages 31. Earth stations 301 and 302 then use the network addresses for the communication channel establishment step, thereby allowing data communication through communication terminals 401, 402. This includes a case as described in embodiment 2, in which the communication is performed via control station 1 (HUB station 1). That is, in the communication system (communication method) in embodiment 2, earth stations 301 and 302 establish communication channel 22, different from control channel 21, with control station 1 (HUB station 1), in response to the instruction from control station 1 by way of control channel 21, thus achieving bidirectional data communication over communication channel 22.

Figure 3:
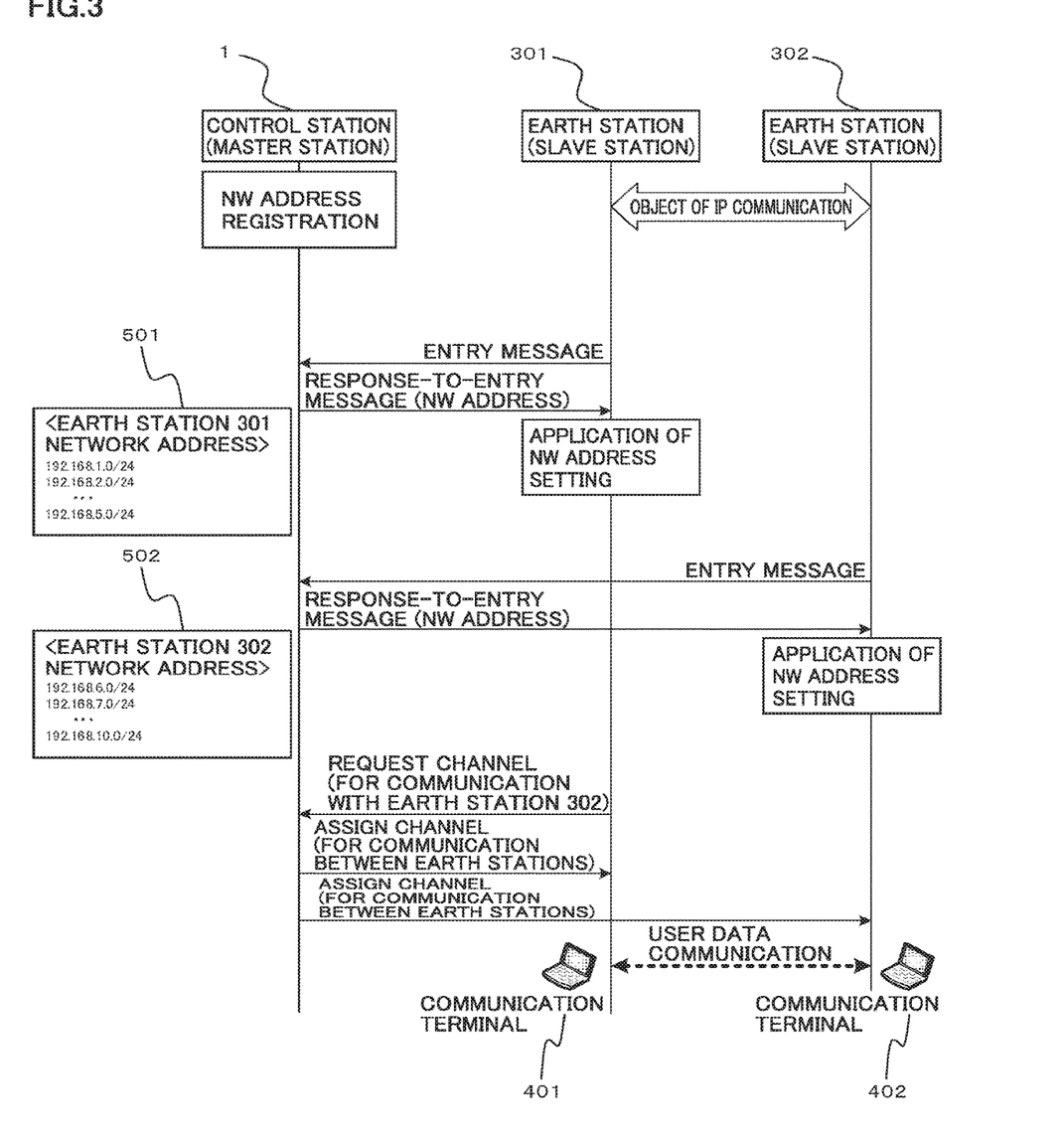
FIG. 3 is a diagram of an example sequence of the communication system in embodiment 1 of the present disclosure.

The network addressing method in embodiment 1 will now be described in more detail with reference to FIG. 3. FIG. 3 shows a case in which two earth stations 3 (earth stations 301 and 302) are connected to control station 1 for IP communication, by way of example. As shown in the example sequence of FIG. 3, control station 1 registers, in advance, the network addresses of IP terminals 4 (communication terminals 4) in network address manager 11. The network addressing method in embodiment 1 may include such a step of registering the network addresses of earth stations 3 to control station 1, in advance, to be managed by control station 1 (network address registration step). IP terminal 4 (communication terminal 4) is a terminal to perform IP communication using satellite channel 22 (communication channel 22). Network address manager 11 may register the network addresses of not only communication terminals 401, 402, but also communication terminals 403 to 40*n*.

As shown in the example sequence of FIG. 3, when earth stations 301, 302 are to enter the satellite communication system, earth station controllers 32 of earth stations 301, 302 send entry messages to control station 1. Control station 1 receives, at its control station controller 12, the entry messages from earth stations 301, 302. In order to notify response-to-entry messages, control station controller 12 transmits, to the corresponding earth station controllers 32, network address tables 501, 502 from among the network addresses registered (held) in network address manager 11. That is, control station 1 notifies earth stations 301, 302 of the corresponding network addresses to be managed by them. Earth station controller 32 of earth station 301 stores network address table 501 into network address storage 31 of earth station 301. Earth station controller 32 of earth station 302 stores network address table 502 into network address storage 31 of earth station 302. These operations are called "application of network address setting".

Once the application of network address setting has completed and a communication channel is established between earth station 301 and earth station 302, then using the network addresses notified by control station 1, earth station communication interfaces 33 of earth stations 301 and 302 can transmit and receive data via established communication channel 22. This enables the user data communication through IP communication between communication terminal 401 and communication terminal 402. Such establishment of communication channel 22 for the transmission and reception of data may be done by using a DAMA system, where channel assignment is requested in response to the initiation of IP communication as a trigger (communication channel establishment step).

If a DAMA system is used as the satellite communication system, control station 1 and earth station 3 operate as follows. Control station controller 12 of control station 1 receives, from earth station 3 (earth station controller 32) via control channel 21, a request for channel assignment of the satellite communication system. Control station controller 12 then notifies earth station 3, via control channel 21, of assigned communication channel 22. Earth station controller 32 of earth station 3 sends, to control station 1 via control channel 21, a request for channel assignment of the satellite communication system. Earth station controller 32 of earth station 3 is then notified, via control channel 21, of assigned communication channel 22 by control station 1 (control station controller 12). Thus earth station communication interface 33 can transmit and receive data via communication channel 22 assigned by control station 1 (control station controller 12). Strictly speaking, control station controller 12 in this case is DAMA controller 13.

As shown in the example sequence of FIG. 3, earth stations 301 and 302 can serve as gateways to satellite channel 22 (communication channel 22) by being notified of the network addresses. When communication terminal 401 in earth station 301 performs IP communication to a network other than the network notified to earth station 301 (i.e., other than the network included in network address table 501), the IP packet is transmitted to satellite GW 35 serving as a default gateway, and is then sent from satellite GW 35 to communication channel 22 by way of satellite 2. Conversely, if the IP packet received from satellite channel 22 is directed to any of the addresses of the networks managed by satellite GW 35 (earth station controller 32) (i.e., if directed to any of the network addresses included in network address table 501), then the IP packet is transmitted to that network in its own station, thus establishing communication between IP terminals 4.

With the network addressing method, control station, and earth station in embodiment 1, if communication channel 22 is disconnected because of unstable communication or if the communication between earth station 3 and control station 1 becomes unstable after the establishment of communication channel 22, control station 1 may determine that earth station 3 has been detached. In this case, earth station 3 can transmit an entry message again. Then control station 1 can transmit a network address again, thus updating the network address. When earth station 3 enters again after stopping its operation (the stopping of operation is herein referred to as "communication is interrupted"), the network address can be set by the same procedure.

In such a case, control station 1 and earth station 3 operate as follows. When communication channel 22 assigned to earth station 3 is disconnected or after the communication becomes unstable or interrupted, control station controller 12 of control station 1 receives a re-entry message from earth station 3 using control channel 21, the re-entry message being a message for re-entry to the satellite communication system. Control station controller 12 then notifies again earth station 3, using control channel 21, of a network address from among the network addresses stored in network address manager 11 in association with the respective earth stations 3. When communication channel 22 assigned by control station 1 (control station controller 12 (DAMA controller 13)) is disconnected or after the communication becomes unstable or interrupted, earth station controller 32 of earth station 3 again transmits a re-entry message to control station 1 using control channel 21, the re-entry message being a message for re-entry to the satellite communication system. Then earth station controller 32 is again notified, by control station 1 (control station controller 12), of the network address of at least its own station. Then, earth station communication interface 33 again establishes communication channel 22, using the network address notified by control station 1 (control station controller 12), thereby allowing the transmission and reception of data.

Figure 4:
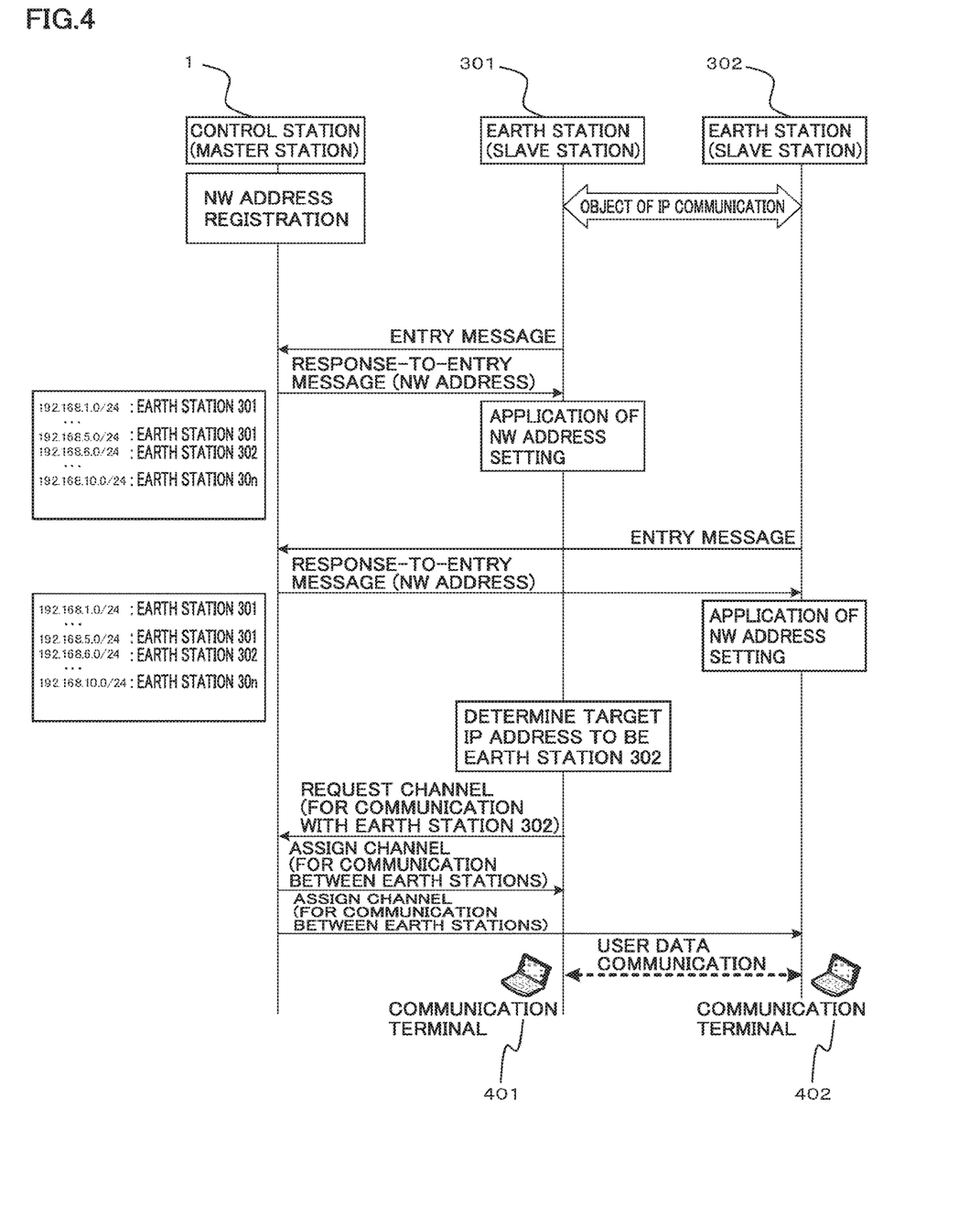
FIG. 4 is a diagram of an example sequence of the communication system in embodiment 1 of the present disclosure.

Another specific example of the network addressing method in embodiment 1 will now be described with reference to FIG. 4. Similar to FIG. 3, FIG. 4 shows a case in which two earth stations 3 (earth stations 301 and 302) are connected to control station 1 for IP communication, by way of example. In the example sequence shown in FIG. 3, earth station 301 is notified of network address table 501, which is the network address of its own station; and earth station 302 is notified of network address table 502, which is the network address of its own station. In the network addressing method in embodiment 1, however, earth station controller 32 may be notified of the network addresses of earth stations 3 other than its own station. In this case, when control station controller 12 receives an entry message from a certain earth station 3, control station controller 12 notifies, to this earth station 3, the network address of this earth station 3 and the network address of another earth station 3. Further, in the network addressing method in embodiment 1, earth station controller 32 may be notified of the network addresses of all the earth stations 3 other than its own station. In this case, when control station controller 12 receives an entry message from a certain earth station 3, control station controller 12 notifies, to this earth station 3, the network addresses of all the earth stations 3. The example sequence shown in FIG. 4, in which the settings are reflected for the network addresses of all the earth stations 3, is suitable for meshed communication.

In the example sequence shown in FIG. 4, earth station controller 32 is notified of the network addresses of all the earth stations 3 other than its own station. The example sequence shown in FIG. 4 will now be described, with a focus on the differences from the example sequence shown in FIG. 3. Network address manager 11 registers all the network addresses of communication terminals 401 to 40n.

As shown in the example sequence of FIG. 4, when earth stations 301, 302 are to enter the satellite communication system, earth station controllers 32 of earth stations 301, 302 send entry messages to control station 1. Control station 1 receives, at its control station controller 12, the entry messages from earth stations 301, 302.

As shown in the example sequence of FIG. 4, in order to notify response-to-entry messages, control station controller 12 transmits, to earth station controllers 32, the corresponding network addresses registered (held) in network address manager 11. That is, control station 1 notifies, to earth stations 301, 302, not only their respective network addresses to be managed by earth stations 301, 302, but also the network addresses to be managed by earth stations 303 to 30n. In other words, the network addresses of all the earth stations 3 are notified. Earth station controller 32 of earth station 301 stores the network addresses into network address storage 31 of earth station 301. Earth station controller 32 of earth station 302 stores the network addresses into network address storage 31 of earth station 302. These operations are called "application of network address setting".

As shown in the example sequence of FIG. 4, once the application of network address setting has completed, then earth station communication interfaces 33 of earth stations 301 and 302 establish communication channel 22, using the network addresses notified by control station 1, thereby allowing the transmission and reception of data. This enables the user data communication through IP communication between communication terminals 4. Such establishment of communication channel 22 for the transmission and reception of data may be done by using a DAMA system, where channel assignment is requested in response to the initiation of IP communication as a trigger. In this case, the following procedures are performed, by way of example, for the channel assignment and the communication channel establishment (communication channel establishment step).

As shown in the example sequence of FIG. 4, when network address tables 501 to 50n are distributed, earth station 301 determines, based on a network address notified by control station 1, whether the IP communication is directed to its own station or directed to another earth station 3 (determination of target IP address). When the communication target earth station 3 is determined based on the network address notified by control station 1, earth station controller 32 of that earth station 3 requests DAMA controller 13, via control channel 21, to assign communication channel 22 for that earth station 3. DAMA controller 13 then notifies earth station controller 32, via control channel 21, of assigned communication channel 22. Then earth station communication interface 33 performs IP communication using the assigned satellite channel. If another IP communication occurs, it is determined whether communication channel 22 has already been assigned or not. If communication channel 22 has already been assigned, the assigned communication channel 22 is used for the IP communication. If communication channel 22 has not been assigned yet, a request for communication channel 22 is sent for assignment, as described above.

As shown in the example sequence of FIG. 4, earth stations 301 and 302 can serve as gateways to satellite channel 22 (communication channel 22) by being notified of the network addresses. When a connection between earth station 301 and earth station 302 is established, earth station 301 sends, to communication channel 22 for earth station 302, an IP packet directed to a network address (network address table 502) in earth station 302. The IP packet received from satellite channel 22, if directed to any of the network addresses managed by satellite GW 35 (earth station controller 32) (i.e., if directed to any of the network addresses included in network address table 501), is transmitted to that network in its own station, thereby establishing communication between IP terminals 4.

Thus, the network addressing method in embodiment 1 includes a case in which the first network address notification step notifies earth station 301 of network address tables 5 of all the earth stations 3. Likewise, the network addressing method in embodiment 1 includes a case in which the second network address notification step notifies earth station 302 of network address tables 5 of all the earth stations 3. Also, the network addressing method in embodiment 1 includes a case in which the first network address notification step notifies earth station 301 of at least network address table 502, in addition to network address table 501. Likewise, the network addressing method in embodiment 1 includes a case in which the second network address notification step notifies earth station 302 of at least network address table 501, in addition to network address table 502. Thus, the communication channel establishment step can establish communication channel 22 between earth station 301 and earth station 302.

In this way, with the network addressing method, control station, and earth station in embodiment 1, network addresses in earth stations 3 (slave stations 3) can be changed. That is, it is not essential to change the IP addresses of communication terminals 4. Thus, as compared to a case of non-changeable network addresses in earth stations 3 (slave stations 3), communication terminals 4 advantageously do not have to change their IP addresses in accordance with the networks. In other words, a DAMA system to perform IP routing can use a terminal having a non-changeable IP address.

Further, with the network addressing method, control station, and earth station in embodiment 1, the change in network address setting, which would have to be done for each station individually, can be achieved with centralized control by the control station. Thus, the networks of the satellite communication stations distributed in various locations can be managed in an integrated or centralized manner, through the means (control station 1) for remotely managing the network addresses in earth stations 3 (slave stations 3). This advantageously eliminates the need for the change in network address setting, which would have to be done for each station individually. This allows easy modification of networks which may arise because of some reason on the side of the ground network of the satellite communication system.

The communication system in embodiment 1 is directed to a communication system using a control station and an earth station in embodiment 1. This is particularly suitable for a DAMA system. The communication method in embodiment 1 is directed to a communication method using a network addressing method in embodiment 1. This is particularly suitable for a DAMA system. Specifically, it is a communication method using an earth station whose network address is specified by the network addressing method in embodiment 1.

Embodiment 2

A communication system, a communication method, a network addressing method, a control station, and an earth station in embodiment 2 of the present disclosure will now be described with reference to FIGS. 5 and 6. In the drawings, the same reference signs designate the same or corresponding parts, and the detailed description of such parts is not repeated. In some cases, the description of parts common to those of embodiment 1 may be omitted. Embodiment 2 is different from embodiment 1 in that a control station in embodiment 2 also serve as a HUB station 1. That is, in the network addressing method in embodiment 2, the communication channel establishment step establishes a communication channel between control station 1 and earth stations 3, with control station 1 serving as HUB station 1. Also, a communication channel may be established between earth station 301 and earth station 302 via HUB station 1. HUB station 1 may be provided outside control station 1.

Figure 5:
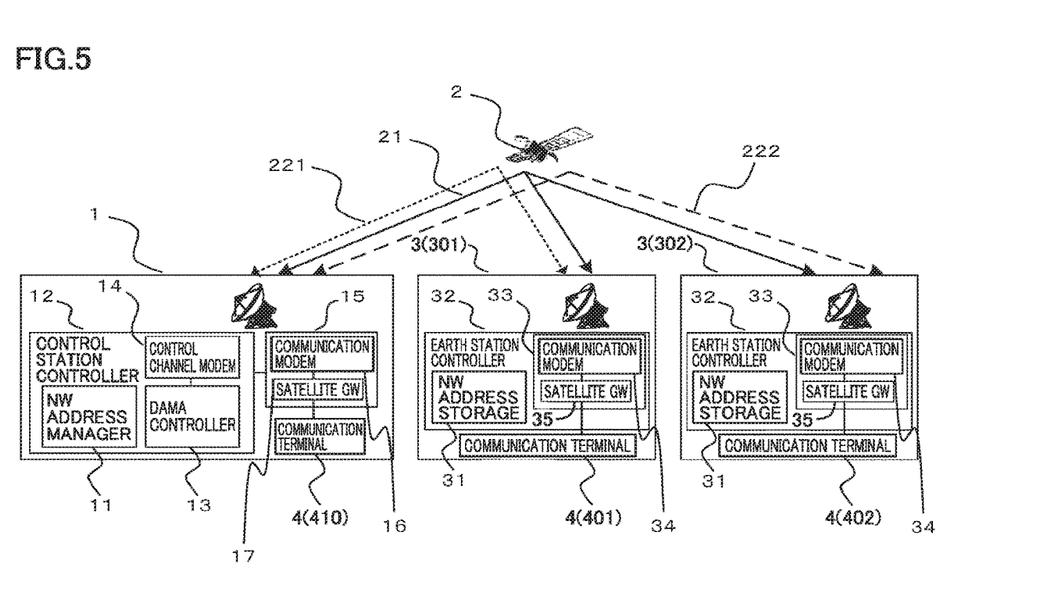
FIG. 5 is a functional block diagram of a communication system in embodiment 2 of the present disclosure.
Figure 6:
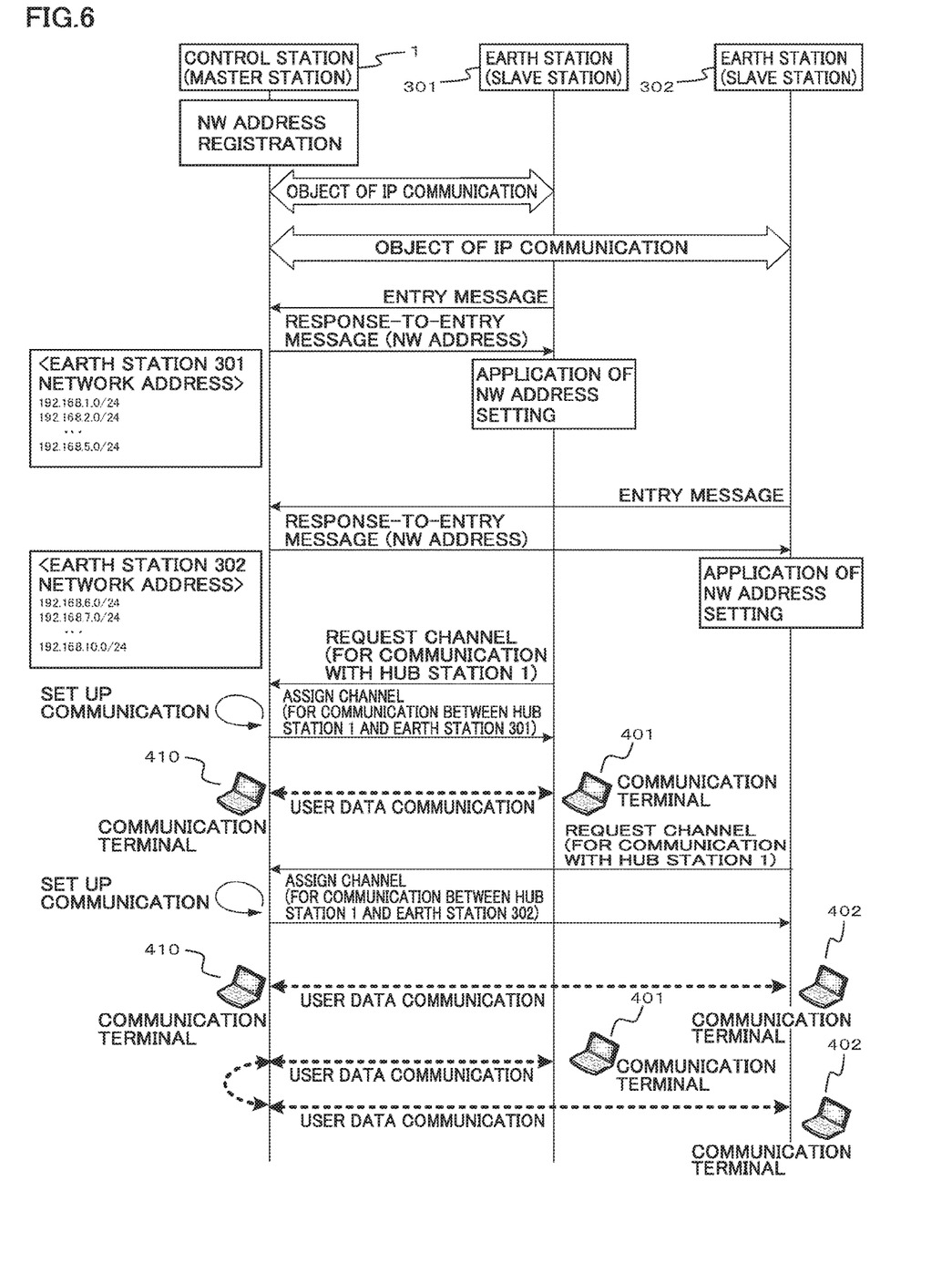
FIG. 6 is a diagram of an example sequence of the communication system in embodiment 2 of the present disclosure.
Figure 7:
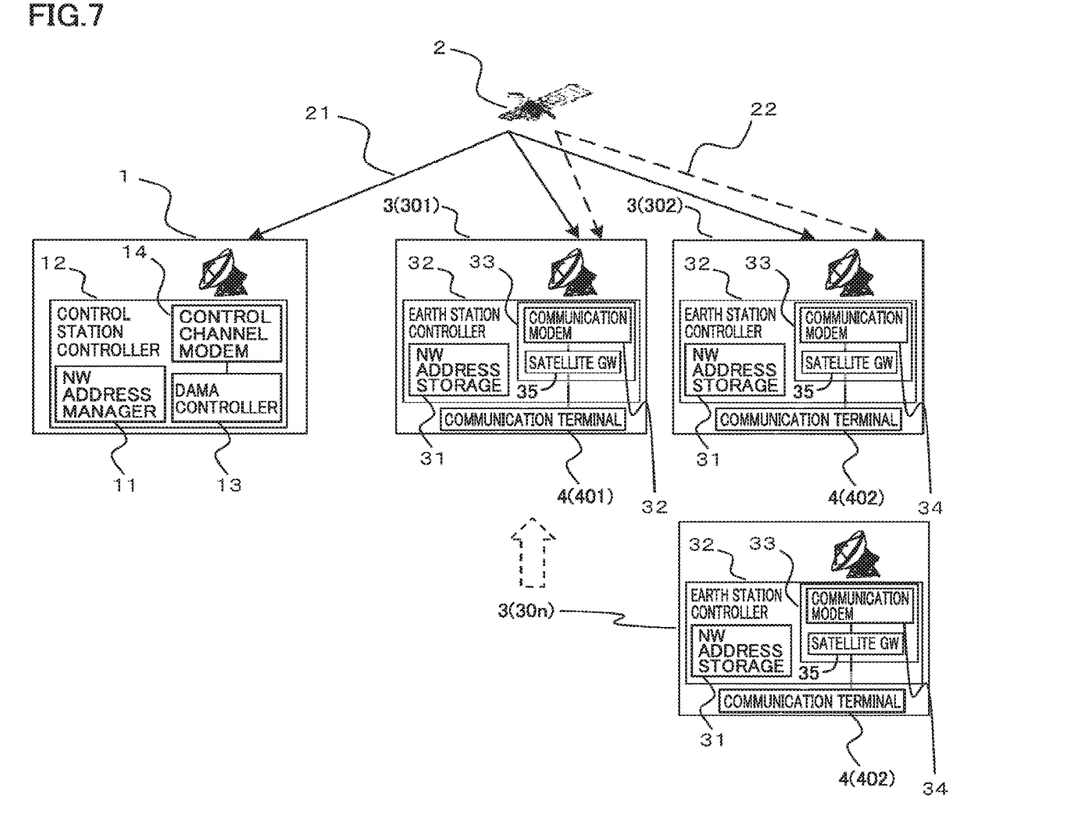
FIG. 7 is a functional block diagram of a communication system in embodiments 1 to 3 of the present disclosure.
Figure 8:
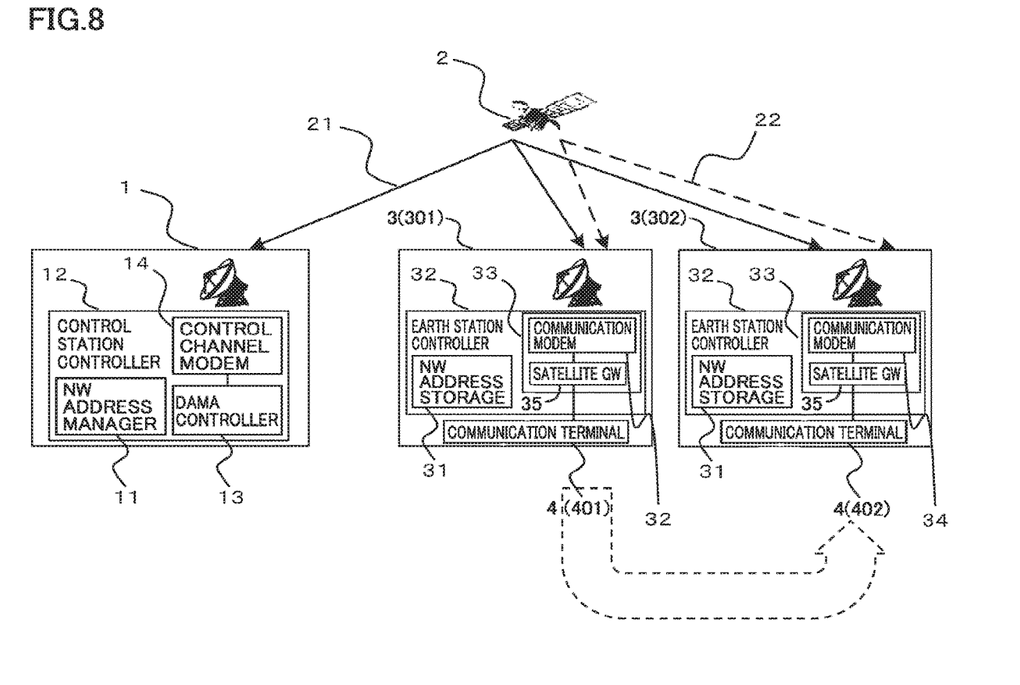
FIG. 8 is a functional block diagram of the communication system in embodiments 1 to 3 of the present disclosure.

In FIGS. 5 and 6, control station 1 includes network address manager 11, control station controller 12, DAMA controller 13, control channel modem 14, a control station communication interface 15 (master station communication interface 15, communication interface 15), a communication modem 16, a satellite GW 17, and a communication terminal 410. Communication terminal 410 may be provided outside control station 1. Control station 1, earth station 301 (slave station 301), earth station 302 (slave station 302), communication terminal 401 (IP terminal 401), communication terminal 402 (IP terminal 402), and communication terminal 410 (IP terminal 410) constitute an IP protocol based DAMA satellite communication system via a satellite 2. Communication terminal 410 (IP terminal 410) may have the same configuration as communication terminals 4 (IP terminals 4). Earth stations 3 establish communication channel 22 in response to the instruction from control station 1 by way of control channel 21, thus achieving bidirectional data communication over communication channel 22 via HUB station 1.

In FIG. 5, network address manager 11 may serve as network address storage 31 in HUB station 1 (control station communication interface 15). Control station communication interface 15 (master station communication interface 15, communication interface 15) performs the routing of data to be transmitted and received via communication channel 22 by earth station 3 which has been notified of the network address. Control station communication interface 15 (master station communication interface 15, communication interface 15), as well as control station controller 12 (master station controller 12, controller 12), can also be called "equipment for transmission and reception to and from satellite 2". Only control station communication interface 15 (master station communication interface 15, communication interface 15) may serve as the equipment for transmission and reception. The equipment for transmission and reception to and from satellite 2 may include a control station antenna and a control station antenna driver to drive the control station antenna; or the control station antenna and the control station antenna driver may also serve as the equipment for transmission and reception.

In FIG. 5, communication modem 16 (control station communication modem 16, master station communication modem 16) is connected to the control station antenna to transmit and receive data to and from earth stations 3. Satellite GW 17 (earth station satellite GW 17, slave station satellite GW 17) serves as a gateway to communication channel 22 (satellite channel 22). Communication terminal 410 is connected to satellite GW 17 for IP communication via communication channel 22. In IP communication via communication channel 22, communication terminal 410 transmits IP data via control station communication interface 15 (master station communication interface 15, communication interface 15) to the opposite station (another earth station 3 or control station 1) of satellite communication, with satellite GW 17 serving as a gateway of communication terminal 4. At least one communication terminal 410 (IP terminal 410) is provided in HUB station 1. FIG. 5 illustrates a case with one communication terminal 410, by way of example.

In FIG. 5, communication channel 22 (satellite channel 22) is shown by being divided into a communication channel 221 (satellite channel 221) and a communication channel 222 (satellite channel 222), for the sake of convenience. Communication channel 221, which is shown as imaginary arrowed dotted lines, indicates communication channel 22 established between HUB station 1 and earth station 301. Communication channel 222, which is shown as imaginary arrowed broken lines, indicates communication channel 22 established between HUB station 1 and earth station 302. Thus, for IP data communication between earth stations 301 and 302, two communication channels 22 (communication channels 221 and 222) are used.

In an example sequence shown in FIG. 6, earth station controller 32 is notified of the network addresses of all the earth stations 3 other than its own station. The example sequence shown in FIG. 6 will now be described, with a focus on the differences from the example sequence shown in FIG. 3 or 4 in embodiment 1. Network address manager 11 may register not only the network addresses of communication terminals 410, 401, 402, but also the network addresses of communication terminals 403 to 40n. As shown in the example sequence of FIG. 6, when earth stations 301, 302 are to enter the satellite communication system, earth station controllers 32 of earth stations 301, 302 send entry messages to control station 1. Control station 1 receives, at its control station controller 12, the entry messages from earth stations 301, 302. In order to notify response-to-entry messages, control station controller 12 transmits, to the corresponding earth station controllers 32, network address tables 501, 502 from among the network addresses registered (held) in network address manager 11. These operations of earth stations 301 and 302 are called "application of network address setting".

As shown in the example sequence of FIG. 6, once the application of network address setting has completed, earth station 301 establishes a communication channel with HUB station 1. Specifically, communication interface 33 of earth station 301 establishes communication channel 221 with communication interface 15 of HUB station 1, using the network address notified by HUB station 1 (control station 1), thereby allowing the transmission and reception of data. Likewise, once the application of network address setting has completed, earth station 302 establishes a communication channel with HUB station 1. Specifically, communication interface 33 of earth station 302 establishes communication channel 222 with communication interface 15 of HUB station 1, using the network address notified by HUB station 1 (control station 1), thereby allowing the transmission and reception of data. Earth station 301 and earth station 302 establish communication channels 221 and 222 (communication channel 22) via HUB station 1, thereby allowing the transmission and reception of data. This enables the user data communication through IP communication between communication terminal 401 and communication terminal 402. Earth stations 301 and 302 can serve as gateways to satellite channel 22 (communication channel 22) by being notified of the network addresses.

As shown in the example sequence of FIG. 6, such establishment of communication channel 22 for the transmission and reception of data may be done by using a DAMA system, where channel assignment is requested in response to the initiation of IP communication as a trigger. In this case, the following procedures are performed, by way of example, for the channel assignment and the communication channel establishment (communication channel establishment step). In earth stations 301 and 302, earth station controllers 32 request DAMA controller 13, via control channel 21, to assign communication channel 22 for HUB station 1, based on the network addresses notified by control station 1. DAMA controller 13 then notifies earth station controllers 32 in earth stations 301 and 302, via control channel 21, of assigned communication channel 22. Then earth station communication interfaces 33 in earth stations 301 and 302 perform IP communication using the assigned communication channel 22. If another IP communication occurs, it is determined whether communication channel 22 has already been assigned or not. If communication channel 22 has already been assigned, the assigned communication channel 22 is used for the IP communication. If communication channel 22 has not been assigned yet, a request for communication channel 22 is sent for assignment, as described above.

When communication terminal 401 in earth station 301 performs IP communication to a network other than the network notified to earth station 301 (i.e., other than the network included in network address table 501), the IP packet is transmitted to satellite GW 35 serving as a default gateway, and is then sent from satellite GW 35 to communication channel 221 by way of satellite 2. The IP packet is transmitted to HUB station 1, and then HUB station 1 determines the routing thereof. Specifically, HUB station 1 determines whether the IP packet should be routed to a network in HUB station 1 or should be transmitted again to any of earth stations 3 other than earth station 301. Thus communication is established between IP terminals 4. That is, earth station communication interface 33 can transmit and receive data to and from another earth station 3 via HUB station 1. The lower part of the example sequence in FIG. 6 shows an example where the data is routed to earth station 302.

In this way, with the network addressing method, control station, and earth station in embodiment 2, when earth station 3 is to enter the communication system, earth station 3 does not require notification of the network addresses of other stations, though requiring notification of the network address of its own station. Each earth station 3 can define satellite channel 22 as a default gateway to the networks other than that of its own station, so that the routing can be determined by HUB station 1. The communication system in embodiment 2 is directed to a communication system using a control station and an earth station in embodiment 2. This is particularly suitable for a DAMA system. The communication method in embodiment 2 is directed to a communication method using a network addressing method in embodiment 2. This is particularly suitable for a DAMA system. Specifically, it is a communication method using an earth station whose network address is specified by the network addressing method in embodiment 2.

Embodiment 3

A communication system, a communication method, a network addressing method, a control station, and an earth station in embodiment 3 of the present disclosure will now be described with reference to FIGS. 1 to 8. In the drawings, like reference signs designate like or corresponding parts, and the detailed description of such parts is not repeated. In some cases, the description of parts common to those of embodiments 1 and 2 is omitted (FIGS. 1 to 6). The network addressing method in embodiment 3 further includes a network address update step. When a network address notified to earth station 301 is updated after the first network address notification step, the network address update step notifies at least the updated part to earth station 301. Likewise, when a network address notified to earth station 302 is updated after the second network address notification step, the network address update step notifies at least the updated part to earth station 302.

That is, the network addressing method in embodiment 3 is different from those of embodiments 1 and 2 in that embodiment 3 includes an operation for changing a network. In embodiment 3, control station 1 can change and delete the network addresses of earth stations 301 and 302 registered in control station 1. Such a process is required when, for example, earth station 30n (slave station 30n) is to newly enter the satellite communication system but network address table 5 for earth station 30n has not been prepared, as shown in the functional block diagram of the communication system in FIG. 7. The situation shown in the functional block diagram of the communication system shown in FIG. 7 can be when earth station 3 is additionally installed. The process may also be required when the connection destination of communication terminal 401 is changed from earth station 301 (slave station 301) to earth station 302 (slave station 302), as shown in the functional block diagram of the communication system in FIG. 8. The following three processes are representative of the processes for changing and deleting a network address from network address table 5.

Control station 1 notifies earth stations 301 and 302 of the update to the network addresses. Then, earth stations 301 and 302 immediately apply the network addresses notified by control station 1, irrespective of whether communication is being performed. Specifically, for an added network address, the routing is added; and for a deleted network address, the routing is stopped. In this case, in the control station in embodiment 3, when a network address notified to earth stations 3 is updated, control station controller 12 notifies at least the updated part to earth stations 3. In an earth station in embodiment 3, when a network address stored in network address storage 31 is updated, earth station communication interface 33 adds routing for an added network address, and stops routing for a deleted network address.

Control station 1 notifies the network address to earth stations 3 that have completed communication. The routing is effective during communication, and the changed routing becomes effective from the next channel assignment. In this case, in the control station in embodiment 3, when a network address notified to earth stations 3 is updated, control station controller 12 notifies at least the updated part to one or more earth stations 3, the one or more earth stations 3 being other than an earth station(s) 3 transmitting and receiving data via communication channel 22.

In order to change a network address, control station 1 may stop all the communication, and then deliver a network address again. For example, the stop and resumption of the satellite communication can be made by control station 1 via control channel 21. In this case, in the control station in embodiment 3, when a network address notified to earth stations 3 is updated, control station controller 12 causes one or more earth stations 3 transmitting and receiving data via communication channel 22 to stop the transmitting and receiving of data. Control station controller 12 then notifies at least the updated part to the one or more earth stations 3. In an earth station in embodiment 3, when a network address stored in network address storage 31 is updated, earth station communication interface 33 adds routing for an added network address.

The communication system in embodiment 3 is directed to a communication system using a control station and an earth station in embodiment 3. This is particularly suitable for a DAMA system. The communication method in embodiment 3 is directed to a communication method using a network addressing method in embodiment 3. This is particularly suitable for a DAMA system. Specifically, it is a communication method using an earth station whose network address is specified by the network addressing method in embodiment 3.

Thus, the present application provides a network addressing method, control station, and earth station that allow the management of network addresses at control station 1, for a satellite communication system to perform routing with communication channel 22 via satellite 2. In a system to perform IP routing between earth stations 3 by giving different network addresses to different communicating earth stations 3, the IP addresses and networks of satellite communication equipment of earth stations 3 can be set and changed via satellite channel 22.

Specifically, in a satellite communication system to perform routing with communication channel 22 via satellite 2, when earth station 3 is to enter the satellite communication system, control station 1 notifies earth station 3, using control channel 21 via satellite 2, of the network address of earth station 3 managed by control station 1. After that, earth station 3 establishes communication channel 22 via satellite 2. In this method, a network is set up when earth station 3 enters a DAMA system. The method eliminates the need for an individual change at each communicating earth station 3.

It should be construed that the embodiments disclosed herein are by way of example in every respect, not by way of limitation. The scope of the present invention is defined not by the above description but by the terms of the claims, and is intended to include any modification within the meaning and scope equivalent to the terms of the claims.

REFERENCE SIGNS LIST

1: control station (master station, HUB station); 11: network address manager (NW address manager 11, network address management device, NW address management device); 12: control station controller (master station controller, controller, control station control device, control device); 13: DAMA controller (DAMA control device); 14: control channel modem; 15: control station communication interface (master station communication interface, communication interface, control station communication device, master station communication device; communication device); 16: communication modem (control station communication modem, master station communication modem); 17: satellite GW (control station satellite GW, master station satellite GW); 2: satellite (satellite station); 21: control channel (CSC); 22: communication channel (satellite channel); 221: communication channel (satellite channel); 222: communication channel (satellite channel); 3: earth station (slave station); 301 to 30n: earth station (slave station); 31: network address storage (NW address storage, network address storage device, NW address storage device); 32: earth station controller (slave station controller; controller, earth station control device, slave station control device; control device); 33: earth station communication interface (slave station communication interface, communication interface, earth station communication device, slave station communication device, communication device); 34: communication modem (earth station communication modem, slave station communication modem); 35: satellite GW (earth station satellite GW, slave station satellite GW); 4: communication terminal (IP terminal); 401: communication terminal (IP terminal); 402: communication terminal (IP terminal); 410: communication terminal (IP terminal); 5: network address table (NW address table)

The invention claimed is:

1. A network addressing method for a demand assignment multiple access (DAMA) satellite communication system through internet protocol (IP) communication to perform routing between earth stations with a communication channel via satellite, the network addressing method using a control station to manage network addresses of the earth stations, each of the network addresses of the earth stations being a network portion of an IP address, the network addressing method comprising:
    transmitting a first entry message from a first earth station of the earth stations to the control station using a control channel via the satellite, the first entry message being a message for entry to the satellite communication system;
    notifying the first earth station of a first network address using the control channel, by the control station, in response to receiving the first entry message, the first network address being the network address of the first earth station managed by the control station;
    transmitting a second entry message from a second earth station of the earth stations to the control station using the control channel, the second entry message being a message for entry to the satellite communication system;
    notifying the second earth station of a second network address using the control channel, by the control station, in response to receiving the second entry message, the second network address being the network address of the second earth station managed by the control station;
    establishing, by the earth stations, the communication channel after at least one of the notifying the first earth station of the first network address and the notifying the second earth station of the second network address, wherein the communication channel is assigned by the control station; and
    communicating user data between a first communication terminal connected to the first earth station and a second communication terminal connected to the second earth station through the established communication channel using an IP address of the first communication terminal generated by combining the first network address and a host portion of an IP address which the first communication terminal has and an IP address of the second communication terminal generated by combining the second network address and a host portion of an IP address which the second communication terminal has, wherein
    the notifying the first earth station of the first network address includes notifying the first earth station of at least the second network address, in addition to the first network address,
    the notifying the second earth station of the second network address includes notifying the second earth station of at least the first network address, in addition to the second network address, and
    the establishing the communication channel includes establishing the communication channel between the first earth station and the second earth station.

2. The network addressing method according to claim 1, wherein the notifying the first earth station of the first network address includes notifying the first earth station of the network addresses of all of the earth stations.

3. The network addressing method according to claim 1, wherein the notifying the second earth station of the second network address includes notifying the second earth station of the network addresses of all of the earth stations.

4. The network addressing method according to claim 1, wherein
    the establishing the communication channel is establishing the communication channel between the first earth station and the second earth station, with the control station serving as a HUB station.

5. The network addressing method according to claim 1, further comprising notifying the first earth station of at least an updated network address, when the network address notified to the first earth station is updated after the notifying the first earth station of the first network address.

6. The network addressing method according to claim 1, further comprising notifying of the second earth station of at least an updated network address, when the network address notified to the second earth station is updated after the notifying the second earth station of the second network address.

7. A control station to manage network addresses of earth stations in a demand assignment multiple access (DAMA) satellite communication system through Internet protocol (IP) communication in which routing between the earth stations is performed with a communication channel via satellite after notification of the network addresses, each of the network addresses of the earth stations being a network portion of an IP address, the control station comprising:
    a network address manager to hold the network addresses in association with the respective earth stations;
    a control station controller to notify the earth stations, using a control channel via the satellite, of a network address from among the network addresses stored in the network address manager in association with the respective earth stations, in response to receiving an entry message from each of one of the earth stations and another of the earth stations included in the earth stations using the control channel, the entry message being a message for entry to the satellite communication system, and to establish a communication channel via satellite between the one of the earth stations and the another of the earth stations, each of the one of the earth stations and the another of the earth stations having been notified of the network address, the communication channel being assigned by the control station, and the communication channel to be used in communicating user data between a first communication terminal connected to the one of earth stations and a second communication terminal connected to the another of earth stations using an IP address of the first communication terminal generated by combining the network address of the one of earth stations and host portion of an IP address which the first communication terminal has and an IP address of the second communication terminal generated by combining the network address of the another of earth stations and host portion of an IP address which the second communication terminal has; and a control station communication interface to perform routing of data to be transmitted and received through the communication channel by the one of the earth stations and the another of the earth stations.

8. The control station according to claim 7, wherein, when the control station controller receives the entry message from one of the earth stations, the control station controller notifies, to the one of the earth stations, the network address of the one of the earth stations and the network address of another of the earth stations.

9. The control station according to claim 7, wherein, when the control station controller receives the entry message from one of the earth stations, the control station controller notifies, to the one of the earth stations, the network addresses of all of the earth stations.

10. The control station according to claim 7, wherein, when the network address notified to the earth stations is updated, the control station controller notifies at least an updated part to the earth stations.

11. The control station according to claim 7, wherein, when the network address notified to the earth stations is updated, the control station controller notifies at least an updated part to one or more of the earth stations, the one or more of the earth stations being other than an earth station transmitting and receiving data via the communication channel.

12. The control station according to claim 7, wherein, when the network address notified to the earth stations is updated, the control station controller causes one or more of the earth stations transmitting and receiving data via the communication channel to stop the transmitting and receiving of data, and then notifies at least an updated part to the one or more of the earth stations.

13. The control station according to claim 7, wherein
the control station controller, in response to receiving a request for assignment of channel of the satellite communication system from one of the earth stations via the control channel, notifies the one of the earth stations, via the control channel, of the communication channel that has been assigned.

14. The control station according to claim 13, wherein, when the communication channel assigned to the one of the earth stations is disconnected or after communication via the communication channel becomes unstable or interrupted, the control station controller again notifies the one of the earth stations, using the control channel, of a network address from among the network addresses stored in the network address manager in association with the respective earth stations, in response to receiving a re-entry message from the one of the earth stations using the control channel, the re-entry message being a message for re-entry to the satellite communication system.

15. An earth station for use in a demand assignment multiple access (DAMA) satellite communication system through internet protocol (IP) communication to perform routing with a communication channel via satellite, the earth station comprising:
a network address storage to store a network address notified by a control station, the network address being a network portion of an IP address;
an earth station controller to transmit an entry message to the control station using a control channel via the satellite, the entry message being a message for entry to the satellite communication system; and to be notified, by the control station, of a network address of at least its own station; and
an earth station communication interface to establish the communication channel to transmit and receive data, using the network address notified by the control station,
wherein the earth station controller is notified of a network address of an earth station other than its own station,
the communication channel is assigned by the control station, and
the earth station communicates user data between a first communication terminal connected to the earth station and a second communication terminal connected to the earth station other than its own station through the established communication channel using an IP address of the first communication terminal generated by combining the network address of the earth station and host portion of an IP address which the first communication terminal has and an IP address of the second communication terminal generated by combining the network address of the earth station other than its own station and host portion of an IP address which the second communication terminal has.

16. The earth station according to claim 15, wherein the earth station controller is notified of network addresses of all of the earth stations other than its own station.

17. The earth station according to claim 15, wherein the earth station communication interface transmits and receives data to and from another earth station via a HUB station which is the control station.

18. The earth station according to claim 15, wherein, when the network address stored in the network address storage is updated, the earth station communication interface adds routing for an added network address, and stops routing for a deleted network address.

19. The earth station according to claim 15, wherein
the earth station controller requests, via the control channel, the control station to assign a channel of the satellite communication system, and is notified, via the control channel, of the communication channel assigned by the control station, so that the earth station communication interface transmits and receives data via the communication channel assigned by the control station.

20. The earth station according to claim 19, wherein, when the communication channel assigned by the control station is disconnected or after communication via the communication channel becomes unstable or interrupted, the earth station controller transmits a re-entry message to the control station using the control channel, the re-entry message being a message for re-entry to the satellite communication system, and is again notified, by the control station, of the network address of at least its own station, so that the earth station communication interface again establishes the communication channel to transmit and receive data, using the network address notified by the control station.

* * * * *